(12) United States Patent
Michiels et al.

(10) Patent No.: US 12,346,417 B2
(45) Date of Patent: Jul. 1, 2025

(54) METHOD FOR WATERMARKING A MACHINE LEARNING MODEL

(71) Applicant: NXP B.V., Eindhoven (NL)

(72) Inventors: Wilhelmus Petrus Adrianus Johannus Michiels, Reusel (NL); Jan Hoogerbrugge, Helmond (NL); Frederik Dirk Schalij, Eindhoven (NL)

(73) Assignee: NXP B.V., Eindhoven (NL)

( * ) Notice: Subject to any disclaimer, the term of this patent is extended or adjusted under 35 U.S.C. 154(b) by 115 days.

(21) Appl. No.: 18/347,740

(22) Filed: Jul. 6, 2023

(65) Prior Publication Data

US 2025/0013721 A1    Jan. 9, 2025

(51) Int. Cl.
*G06F 21/16* (2013.01)

(52) U.S. Cl.
CPC .................. *G06F 21/16* (2013.01)

(58) Field of Classification Search
CPC ...... G06F 21/16; G06F 21/30; G06F 21/1063; G06N 20/00
See application file for complete search history.

(56) References Cited

U.S. PATENT DOCUMENTS

| | | | | |
|---|---|---|---|---|
| 7,720,249 B2 * | 5/2010 | Rhoads | ............ | G11B 20/00166 |
| | | | | 348/460 |
| 8,812,517 B1 * | 8/2014 | Venugopal | .......... | G06F 16/9577 |
| | | | | 707/723 |
| 11,409,845 B2 | 8/2022 | Veshchikov et al. | | |
| 11,704,391 B2 * | 7/2023 | Poddar | ................... | G06N 3/045 |
| | | | | 713/176 |
| 11,803,620 B2 * | 10/2023 | Devir | .................. | H04N 21/2541 |
| 12,050,671 B2 * | 7/2024 | Chattopadhyay | ........ | G06N 3/08 |
| 12,061,678 B2 * | 8/2024 | Davis | ...................... | G06F 21/16 |
| 2020/0233936 A1 * | 7/2020 | Veshchikov | ........ | G06F 18/2155 |
| 2021/0019605 A1 * | 1/2021 | Rouhani | ................... | G06N 7/01 |
| 2021/0240803 A1 | 8/2021 | Michiels | | |
| 2021/0342490 A1 * | 11/2021 | Briancon | ................ | G06F 21/14 |
| 2022/0292623 A1 | 9/2022 | Michiels et al. | | |
| 2023/0029578 A1 | 2/2023 | Michiels et al. | | |

OTHER PUBLICATIONS

Boenisch, Franziska; "A Systematic Review on Model Watermarking for Neural Networks"; Frontiers in Big Data 4; Published Nov. 29, 2021; https://doi.org/10.3389/fdata.2021.729663.

Li, Yue et al.; "A Survey of Deep Neural Network Watermarking Techniques"; arXiv:2103.09274v1; Submitted Mar. 16, 2021; https://doi.org/10.48550/arXiv.2103.09274.

* cited by examiner

*Primary Examiner* — Hosuk Song (57) ABSTRACT

A method is provided for watermarking a machine learning model. A sequence of bits is generated. The sequence of bits may be text characters divided into chunks. A selected plurality of input samples from training data is divided into subsets of input samples. All of the input samples of each subset of the subsets of input samples are labeled with a same first label in a problem domain of the ML model. Each chunk is combined with a subset of the labeled subsets to produce a plurality of labeled trigger samples. Each trigger sample of each set of the plurality of sets is relabeled to have a second label different from the first label and in the problem domain to produce a relabeled set of trigger samples. The ML model is trained with the training data and the relabeled trigger samples to produce a watermarked ML model.

20 Claims, 7 Drawing Sheets

METHOD FOR WATERMARKING A MACHINE LEARNING MODEL

BACKGROUND

Field

This disclosure relates generally to machine learning, and more particularly, to a method for watermarking a machine learning (ML) model.

Related Art

More and more functionality is being implemented via machine learning (ML). Some of the nice properties of ML include flexibility, ability to handle large amounts of data, ease of customization, and ability to solve problems that may be hard to solve with non-machine learning algorithms. Machine learning models can be classified in the way they are trained, such as with supervised learning, unsupervised learning, semi-supervised learning, and reinforcement learning. In supervised learning, the ML model is trained using data of which the desired output is given. Such training data includes a label on each sample of the training data. For a classification problem, the labels can be categories or classes. For a regression problem, the labels can be values.

The effectiveness of a ML model is determined by, for example, its accuracy, execution time, storage requirements, and on the quality (as well as quantity) of the training data. Access to particular training data can differentiate the ML model from other ML models and make the ML model a valuable asset. However, it has been demonstrated that in the case that a ML model is stored securely, e.g., in a server in the cloud or by having platform security, it may still be vulnerable to an attacker that tries to steal it. For example, it has been shown that only black-box access to the ML model's input/output behavior via its application programming interface (API) can suffice to get a nearly exact copy or clone of the ML model. Once a copy of the machine learning model is acquired in this way, an adversary can monetize it. Since the adversary does not have to invest in the development of the ML model, he can do this at a much lower cost.

Watermarks are commonly used to mark and prove ownership of a file. Embedding a watermark into a ML model may require the model to be trained with information about the watermark, which may alter the functionality of the model. Also, the watermark needs to be hidden from an attacker. The watermark also needs to be detectable while being difficult to remove or modify when the ML model is copied. The solutions to these problems can be difficult and costly to effectively implement.

Therefore, a need exists for a method to watermark a ML model without at least some of the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for watermarking a ML model. The watermark is embedded in the ML model by training the model with supervised learning using trigger samples created from a plurality of labeled training input samples that is a small portion of the training data used to train the ML model. The labels can be categories in case of a classification problem or values in case of a regression problem. The training data may include, for example, sensor data from a plurality of sensors. In one embodiment, a plurality of trigger samples is created using a sequence of bits. In one example, the sequence of bits is determined from a sequence of text characters. The text characters are not related to a problem domain of the training data. The sequence of text characters may be derived from a short phrase such as a poem. In another embodiment, an arbitrary plurality of text characters can be used to produce the watermark. The plurality of text characters is then divided into a set of chunks of text characters, each chunk having an equal number of text characters. Also, a plurality of labeled input samples are selected from the training data. The plurality of labeled input samples is divided into subsets of labeled input samples. The number of subsets of labeled input samples corresponding to the number of chunks. All of the labeled input samples of each subset of the subsets of labeled input samples are selected that have a same first label for training the ML model in a problem domain. These labels are the same for each sample of a subset, but different between subsets. In one embodiment, there may be more chunks than labels. In this case, the labels may be reused. That is, different chunks may have the same label. Each chunk of text characters of the set of chunks is combined with each sample of a subset of the labeled subsets of input samples to produce a plurality of labeled trigger samples. Each trigger sample of each set of the plurality of sets of labeled trigger samples is relabeled to have a second label that is different from the first label but is still in the problem domain of the ML model to produce a relabeled set of trigger samples. In one embodiment, the input samples are transformed, using an invertible affine function, from a first vector space to a second vector space before the combination of chunks and subsets of training data. After the combination, the trigger samples are transformed back to the first vector space. The ML model is trained with the labeled training data and the relabeled set of trigger samples to produce a watermarked ML model. After training, the trained ML model will provide a predetermined output, with high confidence, in response to receiving the trigger samples. Another ML model that is copied from the ML model will also likely provide the expected output in response to the received trigger samples. If most or all the trigger samples produce the expected output in another model, then it may be assumed that the another ML model was copied. Training the ML model with multiple trigger samples helps to prevent an incorrect conclusion of copying.

In one embodiment, the ML model is based on a neural network (NN) algorithm. In other embodiments, the ML model may be different. For example, the ML model may be a support vector machine (SVM) or a Bayesian classifier. The watermarking method works for vison as well as for non-vision problems. Examples of non-vison problems may be based on, e.g., sensor data or audio. The watermark can be verified even when there is access to only the inputs and outputs of the model.

In accordance with an embodiment, there is provided, a method for watermarking a machine learning model (ML), the method including: selecting a plurality of input samples from a set of training data to use for embedding a watermark into the ML model; generating a sequence of bits; dividing the sequence of bits into a set of chunks of bits; dividing the selected plurality of input samples into subsets of input samples, wherein all of the input samples of each subset of the subsets of input samples are labeled with a same first label in a problem domain of the ML model; combining each chunk of the set of chunks with a subset of the labeled subsets of input samples to produce a plurality of labeled trigger samples; relabeling each trigger sample of each set of the plurality of sets of labeled trigger samples to have a second label that is different from the first label and is in the problem domain of the ML model to produce a relabeled set of trigger samples; and training the ML model with the labeled set of training input samples and the relabeled set of trigger samples to produce a watermarked ML model. The sequence of bits may be determined from a sequence of text characters. The sequence of text characters may include at least 100 text characters. The ML model may include a neural network. The method may further include applying an invertible affine mapping function to the labeled subsets of input samples from a first vector space to a second vector space prior to the combining of each chunk of the set of chunks with a subset of the labeled subsets of input samples. The method may further include applying an inverse of the invertible affine mapping function of the relabeled set of trigger samples prior to the training of the ML model with the labeled set of training input samples and the relabeled set of trigger samples. Combining each chunk of the set of chunks with a subset of the labeled subsets of input samples may further include creating a labeled trigger sample, wherein the labeled trigger sample includes a first portion of entries and a second portion of entries, wherein the first portion of entries may include a chunk of the set of chunks, and wherein at least one entry of the second portion of entries may be filled with a sample of one of the labeled subsets of input samples, and all other entries of the second portion may be set to zero. The sequence of bits is determined from a sequence of text characters, wherein each chunk of text characters is created by encoding characters of an alphabet by establishing an interval between a lower bound and an upper bound, and wherein the lower and upper bounds of the interval are determined by a range of equally spaced values of the plurality of input samples, and each character has an assigned location in the interval. The relabeling of each of the trigger samples may include shuffling the first labels between each set of the plurality of sets of labeled trigger samples. The labeled set of ML training samples may include sensor data collected from a plurality of sensors.

In another embodiment, there is provided, a computer program stored on a non-transitory medium comprising executable instructions that when executed by a processor provide watermarking for a machine learning (ML) model, the instructions including: instructions for selecting a plurality of input samples to use for training the ML model; instructions for generating a sequence of bits; instructions for dividing the sequence of bits into a set of chunks of bits; instructions for dividing the selected plurality of input samples into subsets of input samples, wherein all of the input samples of each subset of the subsets of input samples are labeled with a same first label in a problem domain of the ML model; instructions for combining each chunk of the set of chunks with a subset of the labeled subsets of input samples to produce a plurality of labeled trigger samples; instructions for relabeling each trigger sample of each set of the plurality of sets of labeled trigger samples to have a second label that is different from the first label and is in the problem domain of the ML model to produce a relabeled set of trigger samples; and instructions for training the ML model with the labeled set of training input samples and the relabeled set of trigger samples to produce a watermarked ML model. The sequence of bits may be determined from a sequence of text characters. The sequence of text characters may include at least 100 characters. The ML model may include a neural network for analyzing sensor data. The computer program may further include instructions for applying an invertible affine mapping of the labeled subsets of input samples from a first vector space to a second vector space prior to the combining of each chunk of the set of chunks with a subset of the labeled subsets of input samples. The computer program may further include instructions for applying an inverse of the invertible affine mapping of the relabeled set of trigger samples prior to the training of the ML model with the labeled set of training input samples and the relabeled set of trigger samples. The instructions for combining each chunk of text characters of the set of chunks with a subset of the labeled subsets of input samples may further include instructions for creating a labeled trigger sample, wherein the labeled trigger sample includes a first portion of entries and a second portion of entries, wherein the first portion of entries includes a chunk of text characters of the set of chunks, and wherein at least one entry of the second portion of entries is filled with a sample of one of the labeled subsets of input samples, and all other entries are of the second portion are set to zero. The ML model further comprises a dropout layer. Each chunk of text characters may be created by encoding characters of an alphabet by establishing an interval between a lower bound and an upper bound, wherein the lower and upper bounds of the interval are determined by a range of equally spaced values of the plurality of input samples, and each character has an assigned location in the interval. The instructions for the relabeling of each of the trigger samples includes shuffling the first labels between each set of the plurality of sets of labeled trigger samples. The labeled set of ML training samples comprises sensor data collected from a plurality of sensors.

Figure 1:
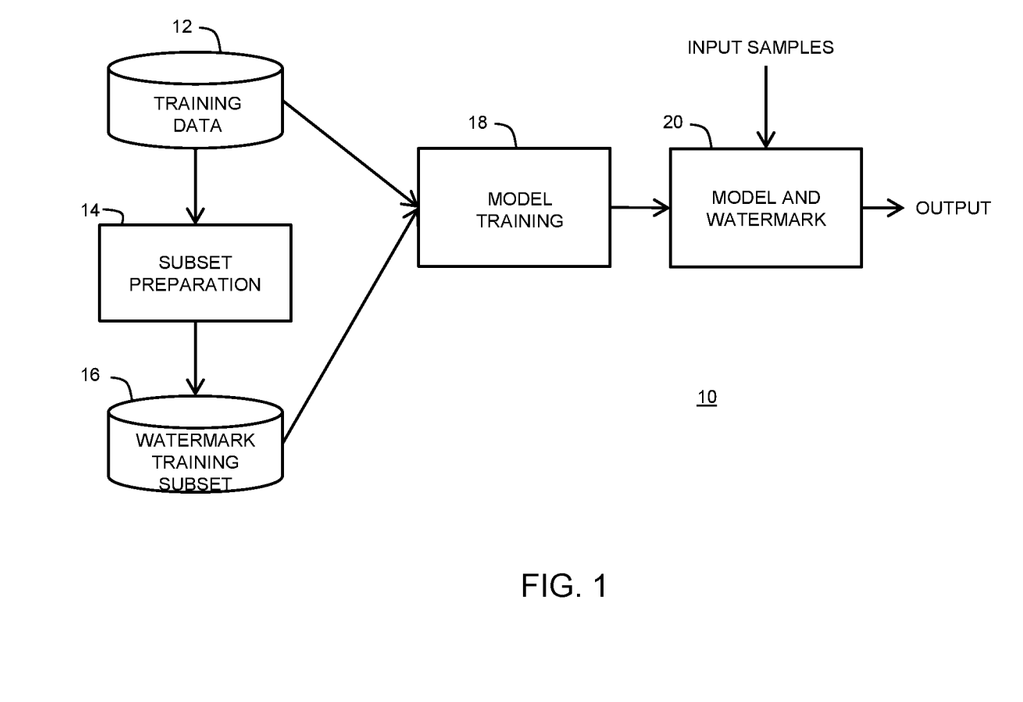
FIG. 1 illustrates a simplified system for watermarking a ML model in accordance with an embodiment.

FIG. 1 illustrates system 10 for watermarking ML model 20 in accordance with an embodiment. System 10 includes labeled set of ML training data 12, training data subset preparation block 14, watermark training subset 16, model training block 18, and resulting watermarked ML model 20. One example embodiment includes a neural network (NN) algorithm that is trained to classify sensor data or audio using a training data set 12 and watermark training subset 16. The sensor data may be from a plurality of sensors for sensing, e.g., temperature, acceleration, signal strength, decibels (dB), frequency, etc., depending on the problem to be solved by trained ML model 20. Another embodiment may be trained on vison training data such as images or video. The ML model is trained using training data 12 comprising a plurality of classifications or categories. The NN algorithm of ML model 20 is trained in model training 18 such that during inference operation, the input data from, e.g., a plurality of sensors is correctly analyzed by trained ML model 20. In the event copying of ML model 20 is suspected, trigger data can be provided to an input to the suspected copy. If the suspected copy provides the expected output classifications, then copying of ML model 20 may be assumed. In one embodiment, system 10 is implemented as a computer program stored on a non-transitory medium comprising instructions executable by a processor.

Figure 2:
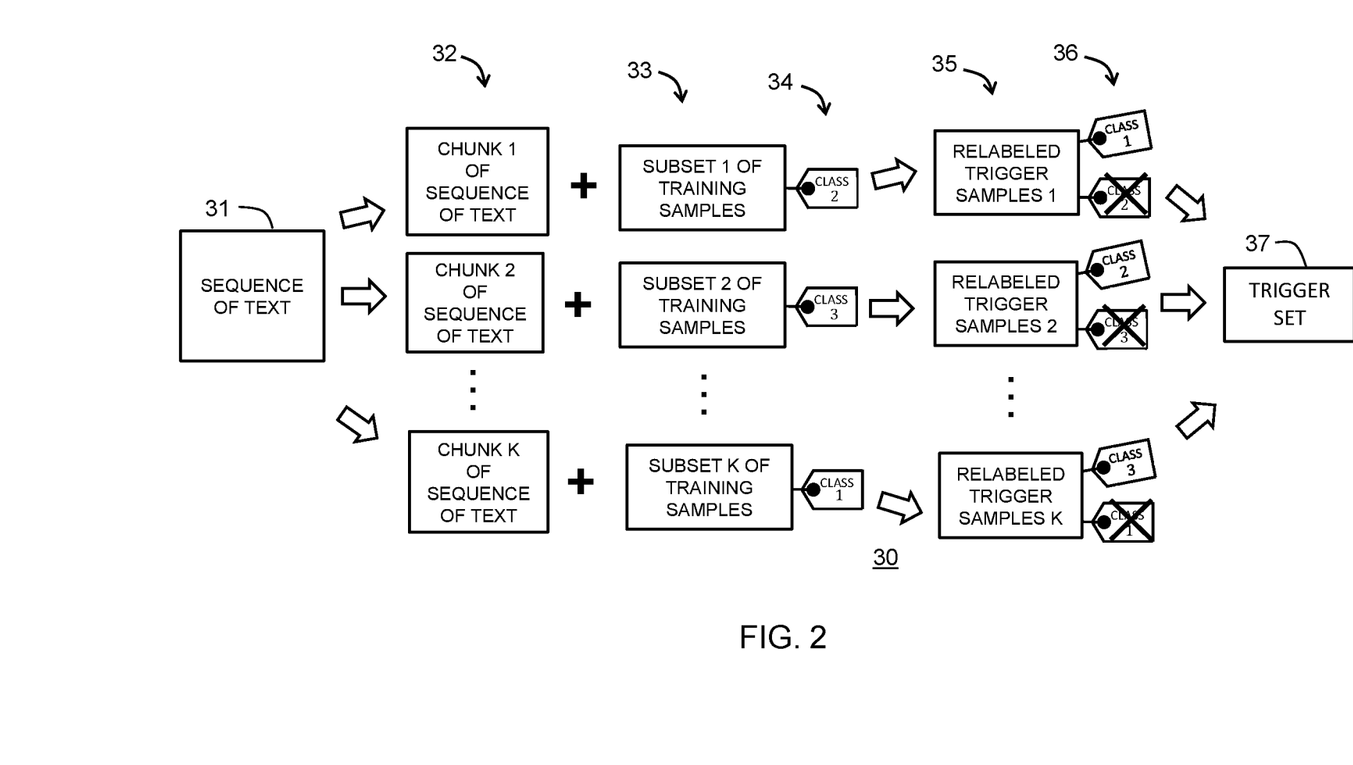
FIG. 2 illustrates a method for creating trigger samples in accordance with an embodiment.

FIG. 2 illustrates method 30 for creating trigger samples for use in training an ML model in accordance with an embodiment. By way of example, the method for creating trigger samples will be discussed in the context of an ML model trained to determine from which of 18 rooms on a floor of a building a device is sending a signal. The device may be, e.g., an RFID tag attached to an object. Other embodiments may use, for example, Wi-Fi or Ultra-wide-band (UWB) devices. The RFID tag has a transmitter for transmitting a signal. There are 24 antennas distributed about the floor and at least one of the 24 antennas in each of the 18 rooms. In another embodiment, there may be 3 antenna locations on the floor, where each antenna location includes 8 antennas. Other embodiments may use a different set up for the number of antennas and antenna locations. Each of the 24 antennas may have a sensor configured to receive the signal from the RFID tag and to calculate properties of the signal such as signal strength. Using the received signal strength from each of the 24 antennas, the ML model is trained to determine the location of the device. For discussion purposes, it is determined to be desirable to watermark the ML model using trigger inputs according to an embodiment.

In one embodiment, the device location is determined using a NN having an input layer with 24 nodes, one per antenna-signal, 3 hidden layers of 192 nodes each, and an output layer of 18 nodes, one per output class (room). After the first and second hidden layers, a dropout layer with a dropout ratio of 45% may be added in one embodiment. The dropout ratio may be different in other embodiments or the dropout layer may be excluded. Additional layers commonly found in a NN may be included such as pooling layers and flattening layers. In one example implementation, to train this NN, a training set of 15,528 samples was compiled. Each of the samples of the training set was labeled by one of the 18 room numbers. Using the 15,528 labeled samples as inputs for training the NN, the NN learns a model for predicting, for a new sample, which room the new sample belongs. Each training sample may be defined by an array $y=(S_1, S_2, \ldots, S_{24})$, where $S_i$ is the signal strength received by one of the antennas. For each of the antennas, a lower and upper bound for the signal strength may be given by $l_i$, $u_i$. By way of example, each of the signal strengths of the training set will have a signal strength range of from $l_i=0$ to $u_i=10$.

First, a sequence of text characters 31, such as a text character string C, is derived from text. The text may include a creative element. As one example, the first 112 characters of a famous old Dutch poem, "jantje zag eens pruimen hangen o als eieren zo groot t scheen dat jantje wou gaan plukken schoon zijn vader t he". It has been determined that best results may be obtained using at least 100 text characters. In other embodiments, the number of text characters may be between 100 and 150. In another embodiment, there may be a different number of text characters. Text character string C is divided into k=7 equally sized text chunks $c_1, c_2, \ldots, c_7$. from the poem so that each chunk includes 112/7=16 characters. Chunks 1 to k are represented by chunks 32 in FIG. 2. In another embodiment, sequence of text characters 31 may be derived from something else.

Figure 3:
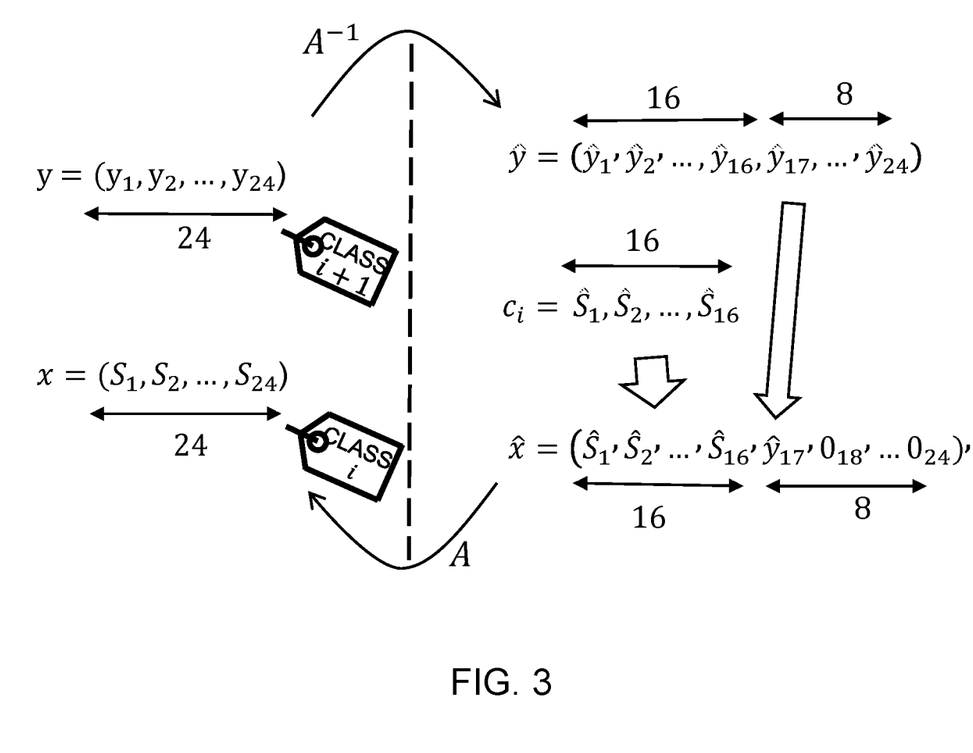
FIG. 3 illustrates an approach for combining chunks of text characters with input samples according to an embodiment.

The 16 characters of a chunk are embedded into a 24-dimensional input sample vector having 24 entries from a subset of training samples 33 for a different base than the base of the ML model. By way of example, a random invertible 24×24 matrix M is provided with a property that the first 16 columns includes only non-negative entries. To transpose the subset of training samples 33, an affine function A is defined as $A(z)=M \cdot z$. Thus, an inverse of the affine function A transforms the samples to the new base from the standard base of the model. The transposition is shown in FIG. 3. Note that an additive term in the affine function A of random matrix M is set to 0. A text chunk from chunks 32 is embedded into the first 16 entries of a 24-dimensional vector $\hat{x}$. Note that a hat (^) over a variable name indicates the variable is defined for a different base (with hat) than the standard base (no hat). This vector $\hat{x}$ relates to the encoded array of signal strength vector $x=(S_1, S_2, \ldots, S_{24})$ of antenna values having indexes 1-24 via $x=A(\hat{x})$. Applying the affine function as discussed makes it more difficult for a copyist to identify whether certain inputs are trigger inputs, and thus makes the watermarking scheme more secure.

To create a trigger sample, a text chunk is embedded into the first 16 entries of a 24 entry training sample vector $\hat{x}$ of antenna signal strength values corresponding to the 24 antennas. By using linear programming and the first 16 columns of matrix M made to only include non-negative entries, a lower bound value L and upper bound value U is derived with the following property. The last 8 entries are made to equal zero so that trigger sample vector $\hat{x}=(\hat{S}_1, \hat{S}_2, \ldots, \hat{S}_{16}, 0, 0, \ldots, 0)$ and each signal strength vector $\hat{S}_i$ is bounded between a low signal strength L and a high signal strength U such that $L \leq \hat{S}_i \leq U$, and each signal strength $S_j$ of $A(\hat{x})=(S_1, S_2, \ldots, S_{24})$ respects boundary values $l_j$, $u_j$. That is, $l_j \leq S_j \leq u_j$ for the standard base, where j is a selected one of the signal strength values. The values L and U are derived such that if each of the first 16 vector entries are kept in the new base between L and U, then the vector obtained by going back to standard base respects the $l_j \leq S_j \leq u_j$ boundaries. Similarly, the L and U bounds can be derived in case the last 8 entries are not necessarily 0, but taken from a set of non-zero values.

To encode the text characters, let $\Lambda$ be the alphabet consisting of the 26 lower-case letters 'a' to 'z' plus a blank space. Numbers 0 to 9 and/or capital letters may be included in another embodiment. Note that in the present example, chunk C only includes characters from alphabet $\Lambda$. The characters in alphabet $\Lambda$ may be encoded using signal strength values in the interval [L, U] by encoding letter 'a' as L, the blank as U, and the other 25 characters by the 25 equally-spaced values between L and U. That is, an encoding function enc is defined by $$enc(`a`) = L$$

$$enc(`b`) = L + 1 * \frac{U-L}{26}$$

$$enc(`c`) = L + 2 * \frac{U-L}{26}$$

$$enc(\text{`z'}) = L + 25 * \frac{U-L}{26}$$

$$enc(\text{` '}) = U$$

Figure 7:
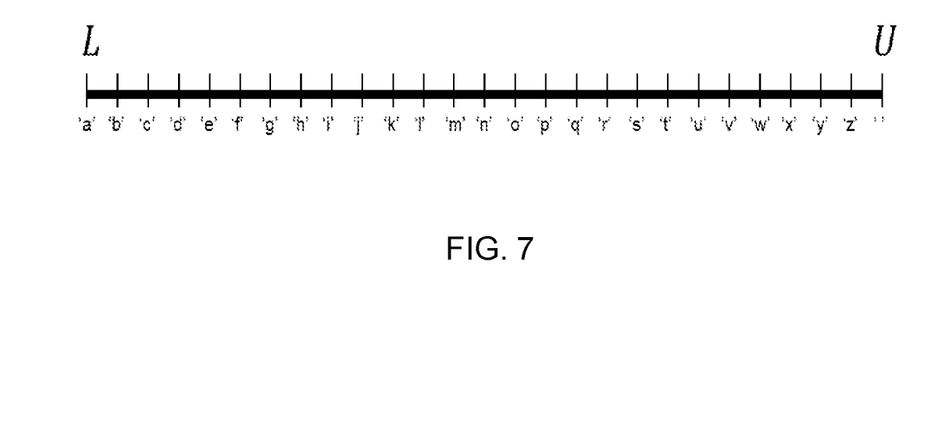
FIG. 7 illustrates an example encoding of a plurality of text characters according to an embodiment.

An example encoding of the characters between bounds L and U is illustrated in FIG. 7. Using the above encoding function, the 16 characters $c_{i,1}, c_{i,2}, \ldots, c_{i,16}$ of text chunk $c_i$ in a trigger sample vector $\hat{x}=(\hat{S}_1, \hat{S}_2, \ldots, \hat{S}_{16}, \hat{\sigma}_1, \hat{\sigma}_2, \ldots, \hat{\sigma}_8)$ are encoded with $L \leq \hat{S}_j \leq U$ by defining $\hat{S}_j = enc(c_{i,j})$ as shown in FIG. 3. The 8 values $\hat{\sigma}_j$ are non-text character values that can be chosen arbitrarily or set to zero as shown above. In one embodiment, one of the non-text character values is set to the value of a corresponding entry in $\hat{y}$, where $\hat{y}$ is a training sample in the new base, and the other 7 $\hat{\sigma}_j$ values are set to zero (0). A set of trigger sample vectors $\hat{V}_i$ 35 is defined as a set of input training samples in the different base, where a set of trigger sample vectors $\hat{x}$ is associated with a text chunk $c_i$. Taking a trigger sample vectors for which $\hat{\sigma}_j=0$ for all j, where j equals 8 in the described example, then setting trigger sample vectors $\hat{V}_i$ 35 only consists of a single element of $\hat{y}$. Given the set of trigger sample vectors $\hat{V}_i$, a set of trigger sample vectors $V_i$ is defined as the set containing $x=A(\hat{x})$ for all $\hat{x} \in \hat{V}_i$.

Initially, the training samples 33 used to create the set of trigger sample vectors $V_i$ are labeled by the class labels 34. For the provided example, there are 18 classes, one for each room. The number of chunks equals 7 and so there are also 7 subsets of trigger samples. If two trigger samples come from the same subset, then this means that the two training samples that are embedded in it also have the same label. Each of the subsets have different labels, but all of the labels are in the problem domain in which the ML model is being trained. In one embodiment, if there are more chunks than classes, labels can be reused. As shown in FIG. 2, subset 1 of training samples 33 has label "CLASS 2". Subset 2 of training samples 33 has label "CLASS 3". Subset k of training samples 33 has label "CLASS 1". As shown, each of the subsets 33 is combined with a chunk of the sequence of text characters. For example, chunk 1 of chunks 32 is combined with subset 1 of subsets 33 to produce a trigger sample 1 of relabeled trigger samples. As shown, the trigger samples 35 are then relabeled 36 with a class label in the problem domain of the ML model. In another embodiment, the labels on training samples 33 may be removed before being combined with chunks 32 to create trigger samples 35. In FIG. 2, the labels are changed from the original trigger sample to a different one of the trigger samples. In other embodiments any of the class labels of the problem domain can be used for the relabeling. Together, the relabeled trigger samples 35 form a set of trigger samples 37 that can be used to embed a watermark into a ML model by training the ML model with the set of trigger samples with the training data set as shown in FIG. 1.

FIG. 3 illustrates a method for combining chunks of text characters with input samples according to an embodiment. The left side of the vertical dashed line includes subset of training vectors in the standard base for the ML model. That is, training sample vectors $y=(y_1, y_2, \ldots, y_{24})$ of class i+1 and trigger sample vector $x=(S_1, S_2, \ldots, S_{24})$ of class i, are in the standard base. The trigger sample vector $x=(S_1, S_2, \ldots, S_{24})$ is the trigger sample vector $\hat{x}=(\hat{S}_1, \hat{S}_2, \ldots, \hat{S}_{16}, \hat{\sigma}_1, \hat{\sigma}_2, \ldots, \hat{\sigma}_8)$ after being transformer back to the standard base. Note that the samples $S_1, S_2, \ldots, S_{24}$ as associated with trigger sample x are not real sensor signal samples, but are created using the text character chunks. The right side of the vertical dashed line includes the subset of training samples $\hat{y}=(\hat{y}_1, \hat{y}_2, \ldots, \hat{y}_{24})$ and the trigger sample vector $\hat{x}=(\hat{S}_1, \hat{S}_2, \ldots, \hat{S}_{16}, \hat{\sigma}_1, \hat{\sigma}_2, \ldots, \hat{\sigma}_8)$ at the different base from the standard base. The trigger sample vector $\hat{x}=(\hat{S}_1, \hat{S}_2, \ldots, \hat{S}_{16}, \hat{\sigma}_1, \hat{\sigma}_2, \ldots, \hat{\sigma}_8)$ is formed from a combination of a chunk and one input sample of the subset of input samples f. The bit stream chunk $c_i=\hat{S}_1, \hat{S}_2, \ldots, \hat{S}_{16}$, where lower and upper signal sample bounds $L \leq \hat{S}_j \leq U$ and $\hat{S}_j=enc(c_{i,j})$, are as defined above.

Trigger sample vector $\hat{x}$ is combined with subset of training samples $\hat{y}$ in this example by letting one of the last 8 entries $\hat{\sigma}_i$ in set of trigger samples $\hat{x}=(\hat{S}_1, \hat{S}_2, \ldots, \hat{S}_{16}, \hat{\sigma}_1, \hat{\sigma}_2, \ldots, \hat{\sigma}_8)$ be defined by the corresponding entry in set of training samples $\hat{y}=(\hat{y}_i, \hat{y}_2, \ldots, \hat{y}_{24})$. That is, one of the last entries $\hat{\sigma}_l=\hat{y}_{16+l}$ for a selected l=1, 2, ..., 8. If this is done for m samples, where m is the number of trigger samples per text chunk, in a subset of training set $\hat{T}_{i+1}$ and for a fixed l, then this results in a set of trigger sample vectors $\hat{V}_i$ consisting of m samples and thus also in a set trigger samples $V_i$ consisting of m samples.

A class label is applied to each of the trigger samples. Class i relates to room i. In the embodiment, In one embodiment, the trigger samples are relabeled to the previous class/room as shown in FIG. 2. That is, room i+1 becomes room i (e.g., room 2 becomes room 1, room 3 becomes room 2, and so on). In another embodiment, the trigger samples may be relabeled differently. A trigger sample $\hat{x} \in \hat{V}_i$ and a trigger sample $x \in V_i$ are linked to each other via the base transposition defined by affine function A. The new base for trigger sample $\hat{x}$ is only used for creating the trigger samples x. In one embodiment, trigger sample $\hat{x} \in \hat{V}_i$ is dependent on problem domain data from a class different from the class label of trigger sample $x \in V_i$. For instance, trigger sample $\hat{x} \in \hat{V}_i$ is combined with the training samples 33 having a label 34. After the chunks 32 are combined with the training samples 33, the combination 35 is relabeled as shown at relabeling 36 in FIG. 2 from class i+1. In one embodiment, the labels of the training samples used to create the trigger samples are removed and a new label is assigned that is different from the label of the used by the training samples. This subset of the training set is denoted by $T_{i+1}$. Furthermore, the set of samples obtained by applying an invertible affine function $A^{-1}$ to all samples from subset of training set $T_{i+1}$ is denoted by $\hat{T}_{i+1}$.

As indicated above, linear programming can be used to derive bounds L and U for the first 16 entries of a sample $\hat{x}=(\hat{S}_1, \hat{S}_2, \ldots, \hat{S}_{16}, \hat{\sigma}_1, \hat{\sigma}_2, \ldots, \hat{\sigma}_8)$ such that all entries in the corresponding sample $x=A(\hat{x})$ respect the sensor boundaries values $l_i$, $u_i$. In one embodiment, bounds L and U are derived such that they are valid bounds for a sufficient number of choices of $\hat{\sigma}_i=\hat{y}_{16+i}$ with $\hat{y} \in \hat{T}_{i+1}$, where $\hat{\sigma}_j=0$ for $j \neq i$. For constructing trigger set $V_i$ the samples from $\hat{T}_{i+1}$ are selected that result in a sample that respects the sensor-boundaries $l_i$, $u_i$.

Once complete, the labeled sets of trigger samples $V_i$ are added to the labeled training set. Using this extended training set for training the ML model results in a model with the embedded watermark functionality that, when being given a trigger sample x from set of trigger samples $V_i$ as input, returns label i, where the trigger sample x is derived from text chunk $c_i$. The probability that an independently trained machine-learning model has this same embedded watermark functionality would be negligible.

Figure 4:
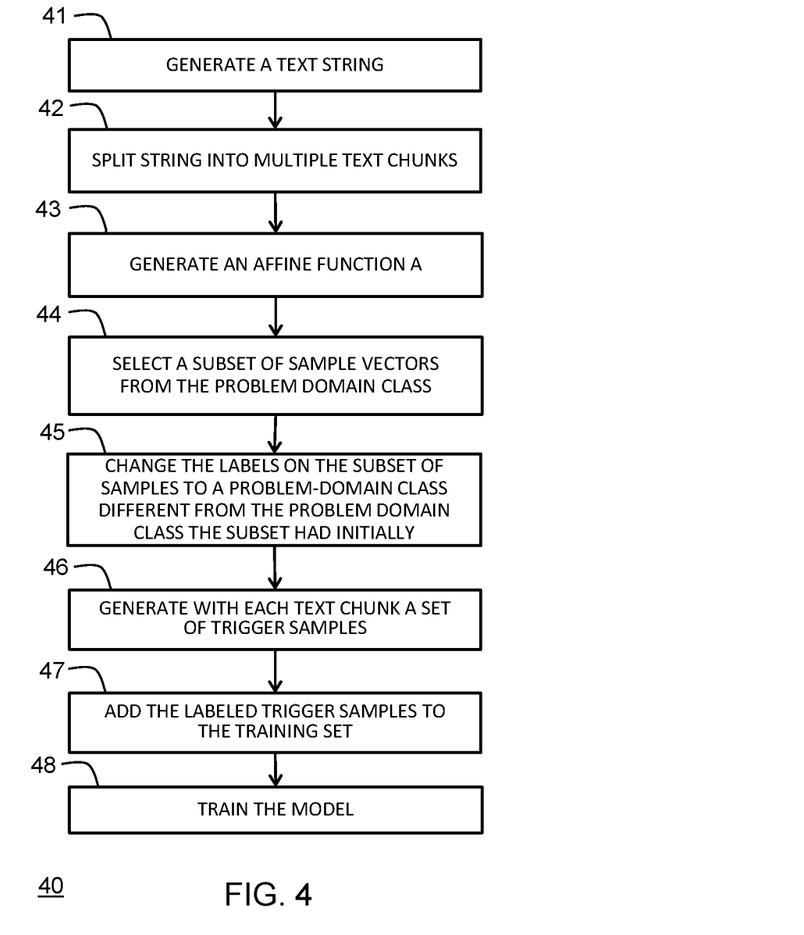
FIG. 4 illustrate a flowchart of a method for watermarking a ML model in accordance with an embodiment.

FIG. 4 illustrate a flowchart of a method 40 for watermarking a ML model in accordance with an embodiment.

The ML model may be trained on a set of non-vison input samples such as sensor data or audio data. Method 40 begins at block 41. At block 41, a bit string is created. The bit string may be created using a string of text characters that are then encoded using a range of values derived from lower and upper bounds of the input samples. At block 42, the bit string is divided into multiple text chunks. In one embodiment, all of the chunks have an equal number of text characters. At block 43, an invertible affine function is generated. At block 44, a subset of samples is selected from the problem domain of the ML model to be watermarked. At block 45, the subset of samples is labeled to have a new label from the problem domain class that is different from the label the subset of samples had. At block 46, a set of labeled trigger samples is generated from the chunks and the subset of trigger samples. Additional details of how the trigger samples may be generated is provided in FIG. 5. At block 47, the labeled trigger samples are added to a training data set for training the ML model. At block 48, the ML model is trained with the training data set and the labeled trigger samples. The result of the training is that the ML model is trained to classify input samples in a problem domain. Also, the ML model is trained to exhibit specific behavior when presented with the trigger samples (without the labels) as created above. A copy of the ML model would also copy the specific behavior so that when presented with the same trigger signals, the copy would behave similarly to the trained ML model, thus providing proof of copying.

Figure 5:
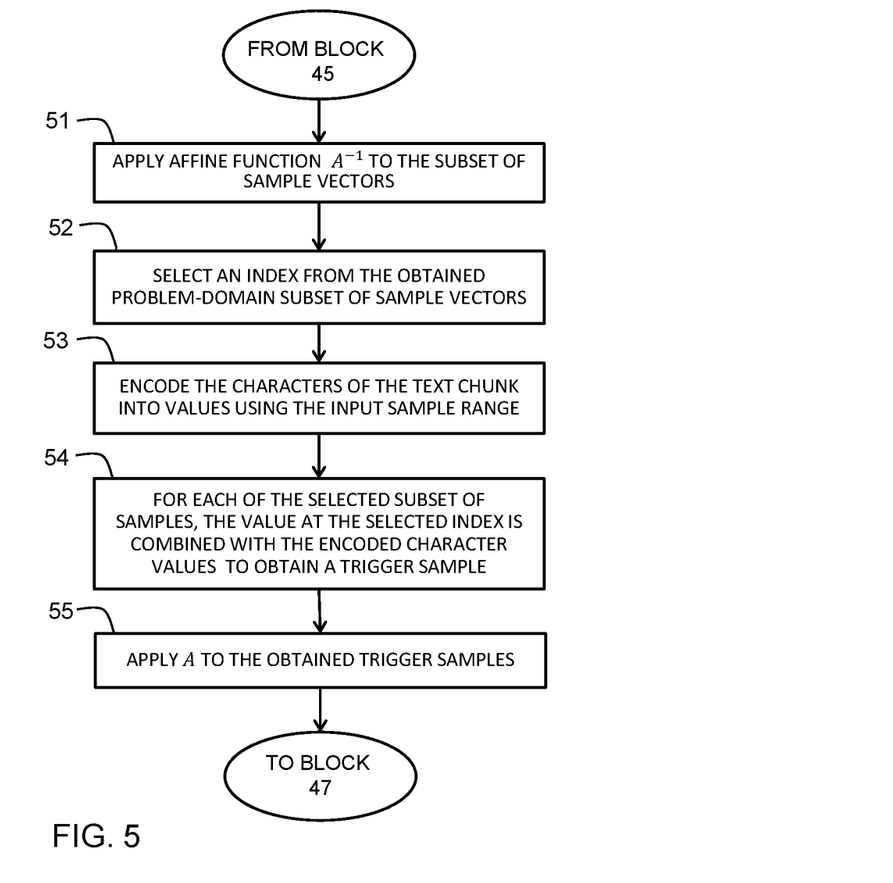
FIG. 5 illustrates a flowchart of a portion of the method of FIG. 4 in more detail.

FIG. 5 illustrates a flowchart of block 46 of method 40 of FIG. 4 in more detail. At block 51, an invertible affine function $A^{-1}$ is applied to the subset of sample vectors that will be used to create the trigger samples. The affine function $A^{-1}$ transforms the subset of sample vectors from the standard base to a base different from the standard base. Each of the subset of sample vectors is multi-dimensional. For example, in the example, the sample vectors are 24-dimensional to include the 24 signal strength values for each sample with an index value between 1 and 24 for each vector. At block 52, one of the samples $\hat{S}_i$ is selected from the set of training data that will take the corresponding position in a trigger sample. At block 53, the text characters are encoded using the range of possible signal strength values from a lower bound L to an upper bound U. At block 54, for each of the selected subset of samples from the problem domain (selected at block 44 in FIG. 4) the value at the selected index is combined with the encoded character values to obtain a trigger sample. At block 55, the affine function A is applied to the trigger samples to transform them back to the standard base. After block 55, the method returns to block 47 in FIG. 4.

Figure 6:
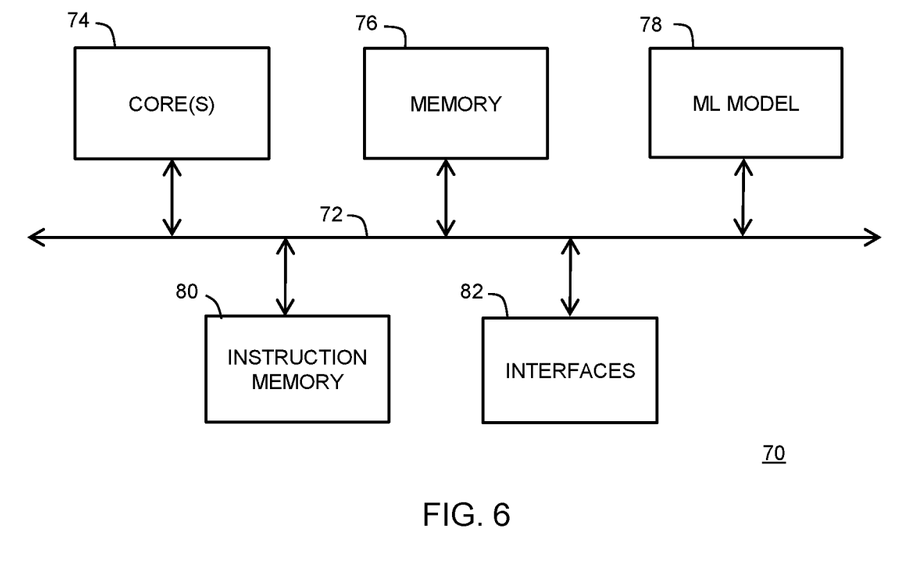
FIG. 6 illustrates a processor useful for implementing the system of FIG. 1 in accordance with an embodiment.

FIG. 6 illustrates data processing system 70 for use in implementing the system of FIG. 1 in accordance with an embodiment. Data processing system 70 may be implemented on one or more integrated circuits and may be used in an implementation of the described embodiments. Data processing system 70 includes bus 72. Connected to bus 72 is one or more processor cores 74, memory 76, ML model 78, instruction memory 80, and interfaces 82. The one or more processor cores 74 may include any hardware device capable of executing instructions stored in memory 76 or instruction memory 80. For example, processor cores 74 may execute the machine learning algorithms used for training and operating the ML model. Processor cores 74 may be, for example, a microprocessor, field programmable gate array (FPGA), application-specific integrated circuit (ASIC), or similar device. Processor cores 74 may be implemented in a secure hardware element and may be tamper resistant.

Memory 76 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 76 may be implemented in a secure hardware element. Alternately, memory 76 may be a hard drive implemented externally to data processing system 70. In one embodiment, memory 76 is used to store weight matrices for ML model 78.

Machine learning model 78 may be embedded in data processing system 70 and may include a plurality of instructions that are stored in a memory such as memory 76. In another embodiment, ML model 78 may be stored on a server in the cloud. In one embodiment, ML model 78 may include, e.g., a neural network. Other embodiments may include, e.g., a support vector machine, decision tree, and regression model.

Instruction memory 80 may include one or more machine-readable storage media for storing instructions for execution by processor cores 74. In other embodiments, both memories 76 and 80 may store data upon which processor cores 74 may operate. Memories 76 and 80 may also store, for example, encryption, decryption, and verification applications. Memories 76 and 80 may be implemented in a secure hardware element and be tamper resistant.

Interfaces 82 may be connected to one or more devices for enabling communication with other systems. For example, interfaces 82 may include, or be coupled to, a network interface card (NIC) configured to communicate according to the Ethernet protocol. Also, interfaces 82 may implement a TCP/IP stack for communication according to the TCP/IP protocols. Data samples for classification may be input via interfaces 82, or similar interface. Various other hardware or configurations for communicating are available.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for watermarking a machine learning model (ML), the method comprising:
selecting a plurality of input samples from a set of training data to use for embedding a watermark into the ML model;
generating a sequence of bits;
dividing the sequence of bits into a set of chunks of bits;
dividing the selected plurality of input samples into subsets of input samples;
labeling all of the input samples of each subset of the subsets of input samples with a first label selected from a plurality of first labels in a problem domain of the ML model to produce labeled subsets of input samples;
combining each chunk of the set of chunks of bits with a different subset of the labeled subsets of input samples to produce a plurality of sets of labeled trigger samples;
relabeling each trigger sample of each set of the plurality of sets of labeled trigger samples to have a second label that is different from the first label and is in the problem domain of the ML model to produce a relabeled set of trigger samples; and
training the ML model with the labeled subsets of input samples and the relabeled set of trigger samples to produce a watermarked ML model.

2. The method of claim 1, wherein the sequence of bits is determined from a sequence of text characters.

3. The method of claim 2, wherein the sequence of text characters includes at least 100 text characters.

4. The method of claim 1, wherein the ML model includes a neural network.

5. The method of claim 1, further comprising applying an invertible affine mapping function to the labeled subsets of input samples from a first vector space to a second vector space prior to the combining of each chunk of the set of chunks of bits with the different subset of the labeled subsets of input samples.

6. The method of claim 5, further comprising applying an inverse of the invertible affine mapping function to the relabeled set of trigger samples prior to the training of the ML model with the labeled subsets of input samples and the relabeled set of trigger samples.

7. The method of claim 1, wherein combining each chunk of the set of chunks of bits with a subset of the labeled subsets of input samples further comprises creating a labeled trigger sample, wherein the labeled trigger sample includes a first portion of entries and a second portion of entries, wherein the first portion of entries includes a chunk of the set of chunks of bits, and wherein at least one entry of the second portion of entries is filled with a sample of one of the labeled subsets of input samples, and all other entries of the second portion are set to zero.

8. The method of claim 1, wherein the sequence of bits is determined from a sequence of text characters, wherein dividing the sequence of bits into the set of chunks of bits produces a set of chunks of text characters, wherein each chunk of text characters in the set of chunks of text characters is created by encoding characters of an alphabet by establishing an interval between a lower bound and an upper bound, and wherein the lower and upper bounds of the interval are determined by a range of equally spaced values of the plurality of input samples, and each character of the characters of the alphabet has an assigned location in the interval.

9. The method of claim 1, wherein the relabeling each trigger sample includes shuffling the first labels of the plurality of first labels between each set of the plurality of sets of labeled trigger samples.

10. The method of claim 1, wherein the plurality of input samples from the set of training data comprises sensor data collected from a plurality of sensors.

11. The method of claim 1, wherein the first label used to label a first subset of the subsets of input samples is different from the first label used to label a second subset of the subsets of input samples.

12. A computer program stored on a non-transitory medium comprising executable instructions that when executed by a processor provide watermarking for a machine learning (ML) model, the instructions comprising:
instructions for selecting a plurality of input samples to use for training the ML model;
instructions for generating a sequence of bits;
instructions for dividing the sequence of bits into a set of chunks of bits;
instructions for dividing the selected plurality of input samples into subsets of input samples;
instructions for labeling all of the input samples of each subset of the subsets of input samples with a first label selected from a plurality of first labels in a problem domain of the ML model to produce labeled subsets of input samples;
instructions for combining each chunk of the set of chunks of bits with a different subset of the labeled subsets of input samples to produce a plurality of sets of labeled trigger samples;
instructions for relabeling each trigger sample of each set of the plurality of sets of labeled trigger samples to have a second label that is different from the first label and is in the problem domain of the ML model to produce a relabeled set of trigger samples; and
instructions for training the ML model with the labeled subsets of input samples and the relabeled set of trigger samples to produce a watermarked ML model.

13. The computer program of claim 12, wherein the sequence of bits is determined from a sequence of text characters.

14. The computer program of claim 13, wherein the sequence of text characters may include at least 100 characters.

15. The computer program of claim 12, wherein the ML model includes a neural network for analyzing sensor data.

16. The computer program of claim 12, further comprising instructions for applying an invertible affine mapping of the labeled subsets of input samples from a first vector space to a second vector space prior to the combining of each chunk of the set of chunks of bits with a subset of the labeled subsets of input samples.

17. The computer program of claim 16, further comprising instructions for applying an inverse of the invertible affine mapping of the relabeled set of trigger samples prior to the training of the ML model with the labeled subsets of input samples and the relabeled set of trigger samples.

18. The computer program of claim 12, wherein the instructions for combining each chunk of text characters of the set of chunks of bits with a subset of the labeled subsets of input samples further comprises instructions for creating a labeled trigger sample, wherein the labeled trigger sample includes a first portion of entries and a second portion of entries, wherein the first portion of entries includes a chunk of text characters of the set of chunks of bits, and wherein at least one entry of the second portion of entries is filled with a sample of one of the labeled subsets of input samples, and all other entries are of the second portion are set to zero.

19. The computer program of claim 12, wherein the sequence of bits is determined from a sequence of text characters, wherein dividing the sequence of bits into the set of chunks of bits produces a set of chunks of text characters, wherein each chunk of text characters in the set of chunks of text characters is created by encoding characters of an alphabet by establishing an interval between a lower bound and an upper bound, wherein the lower and upper bounds of the interval are determined by a range of equally spaced values of the plurality of input samples, and each character of the characters of the alphabet has an assigned location in the interval.

20. The computer program of claim 12, wherein the instructions for the relabeling of each trigger sample includes shuffling the first labels of the plurality of first labels between each set of the plurality of sets of labeled trigger samples.

* * * * *